(12) United States Patent
Lin (10) Patent No.: US 8,102,283 B2
(45) Date of Patent: Jan. 24, 2012

(54) KEYPAD ASSEMBLY AND PORTABLE ELECTRONIC DEVICE USING THE SAME

(75) Inventor: Yi-Peng Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 866 days.

(21) Appl. No.: 12/170,536

(22) Filed: Jul. 10, 2008

(65) Prior Publication Data

US 2009/0167570 A1 Jul. 2, 2009

(30) Foreign Application Priority Data

Dec. 26, 2007 (CN) .......................... 2007 1 0203411

(51) Int. Cl.
*H03K 17/94* (2006.01)
*H04M 1/00* (2006.01)

(52) U.S. Cl. ..................... 341/22; 455/575.4

(58) Field of Classification Search .............. 341/22; 455/575.4
See application file for complete search history.

(56) References Cited

U.S. PATENT DOCUMENTS

| 7,235,738 | B2* | 6/2007 | Horinouchi et al. ............ 174/50 |
| 7,369,882 | B2* | 5/2008 | Hwang et al. .............. 455/575.1 |
| 7,546,150 | B2* | 6/2009 | Makino ....................... 455/575.1 |
| 7,688,311 | B2* | 3/2010 | Fyke et al. ..................... 345/169 |
| 7,869,840 | B2* | 1/2011 | Kim et al. ................... 455/575.1 |
| 7,930,008 | B2* | 4/2011 | Ko ............................. 455/575.4 |
| 7,991,441 | B2* | 8/2011 | Kim et al. ................... 455/575.3 |
| 2004/0224732 | A1* | 11/2004 | Lee et al. ................... 455/575.3 |
| 2005/0272488 | A1* | 12/2005 | Zou ............................. 455/575.4 |
| 2005/0288075 | A1* | 12/2005 | Geernaert ................... 455/575.4 |
| 2008/0064452 | A1* | 3/2008 | Kim et al. ................... 455/575.3 |
| 2008/0096619 | A1* | 4/2008 | Kuga et al. ................. 455/575.4 |
| 2008/0125201 | A1* | 5/2008 | Kim et al. ................... 455/575.4 |

FOREIGN PATENT DOCUMENTS

| CN | 2705966 Y | 6/2005 |
| CN | 1933497 A | 3/2007 |
| WO | WO2007/024395 A1 | 3/2007 |

* cited by examiner

*Primary Examiner* — Jared Fureman
*Assistant Examiner* — Scott Bauer
(74) *Attorney, Agent, or Firm* — Altis Law Group, Inc.

(57) ABSTRACT

A keypad assembly (20) including a key module (30) and a base unit (90) is described. The key module includes an operating surface (31), and the operating surface has a keypad (32) disposed thereon. The key module is rotatably and slidingly installed on the base unit. A portable electronic device (100) using the keypad assembly is also described.

13 Claims, 8 Drawing Sheets

KEYPAD ASSEMBLY AND PORTABLE ELECTRONIC DEVICE USING THE SAME

BACKGROUND OF THE INVENTION

1. Field of the Invention

The present invention relates to a keypad assembly and a portable electronic device using a keypad assembly.

2. Discussion of the Related Art

With rapid development of communication, portable electronic devices, such as cellular phones and personal digital assistant (PDA) are now in widespread use, and consumers may now enjoy the full convenience of high technology products almost anytime and anywhere. At the same time, consumer and user demands have continued to push a dramatic desire in the multimedia functions of such portable electronic devices.

Typically, a conventional bar-type portable electronic devices include a body, a keyboard and an internal digital camera (DC) module. The DC module generally is installed in the back side of the portable electronic device, and the camera lens is thus exposed at all time. In this case, the camera lens is subject to being damaged and contaminated by dirt and dust. To deal with this problem, dust covers may be mounted on the DC. However, installation of the dust covers would inevitably increase thickness of the portable electronic devices and thus cannot meet the desire to be thin and light.

Therefore, there is room for improvement within the art.

BRIEF DESCRIPTION OF THE DRAWINGS

Many aspects of the keypad assembly can be better understood with reference to the following drawings. The components in the drawings are not necessarily to scale, the emphasis instead being placed upon clearly illustrating the principles of the present keypad assembly. Moreover, in the drawings, like reference numerals designate corresponding parts throughout the several views.

DETAILED DESCRIPTION OF THE EMBODIMENTS

Figure 1:
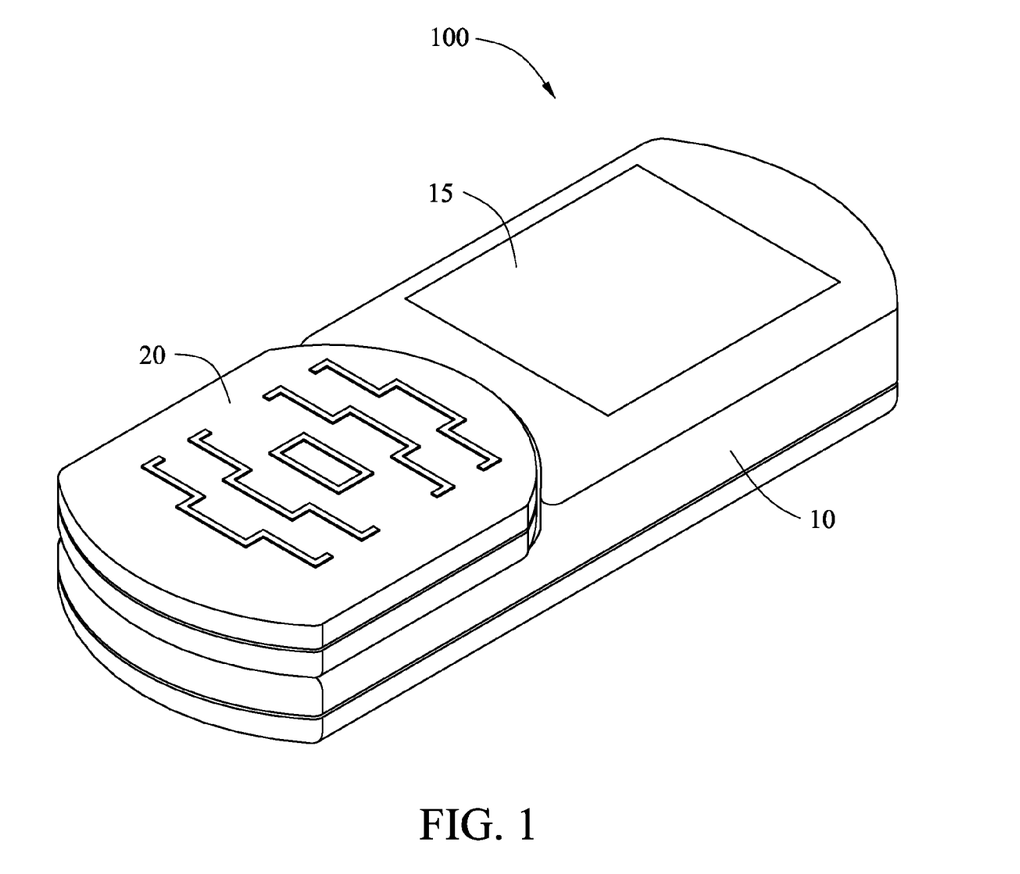
FIG. 1 is an isometric view of a portable electronic device according to an exemplary embodiment.
Figure 2:
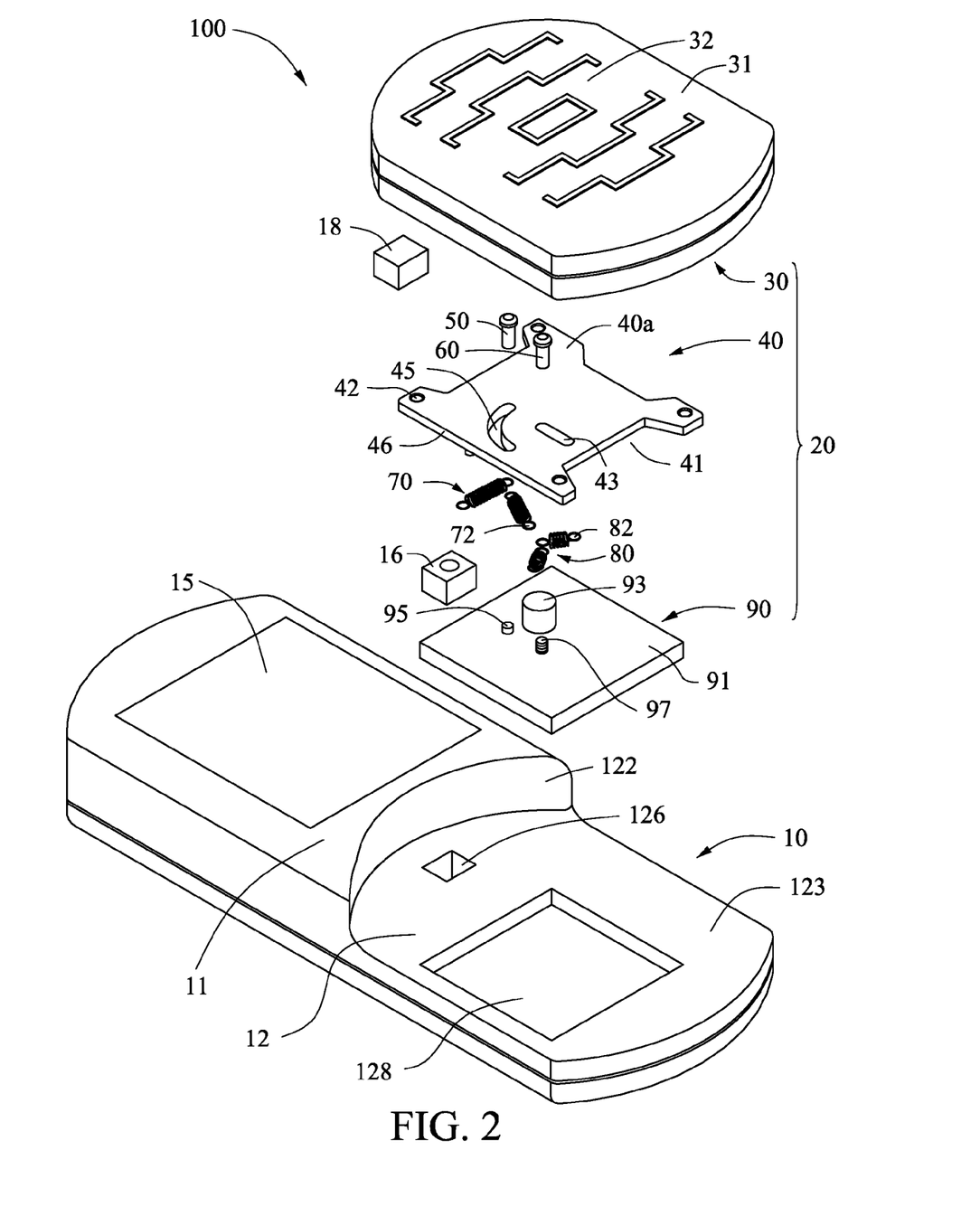
FIG. 2 is an exploded isometric view of the portable electronic device of FIG. 1.

FIGS. 1 and 2 show a portable electronic device 100 with a rotatably mounted keypad assembly 20. The portable electronic device 100 includes a main body 10, a first DC module 16, a second DC module 18 and the keypad assembly 20. The main body 10 is substantially rectangular. A display 15 is arranged on a top surface 11 of the main body 10, and a partially arcuate surface 12 is defined in one end of a top surface 11 opposite to the display 15. In this way, an arcuate sidewall 122 and a bottom wall 123 perpendicular to the sidewall 122 are formed in the main body 10.

The bottom wall 123 further includes a first DC mounting portion 126 and a keyboard mounting portion 128. The first DC mounting portion 126 is a substantially rectangular cavity, and is defined adjacent to the sidewall 122. The keyboard mounting portion 128 is also a substantially rectangular cavity, but has a larger size than the first DC mounting portion 126. In the embodiment, the keypad assembly 20 can be rotated clockwise. As such, the keyboard mounting portion 128 is defined in a position closer to the left side surface (not labeled) of the main body 10. In alternative embodiments, the position of the keypad assembly 20 may be varied according to the orientation of the keypad assembly 20. For example, the keyboard mounting portion 128 may be defined in a position closer to the right side surface of the main body 10 when the keypad assembly 20 may be rotated counter-clockwise.

The keypad assembly 20 is configured to be installed in the keyboard mounting portion 128. The keypad assembly 20 includes a key module 30, a rotating member 40, and a base unit 90. The key module 30 includes an operating surface 31 and a mounting surface 35 (referring to FIG. 3) opposite to the operating surface 31. A keypad 32 is arranged on the operating surface 31.

Figure 3:
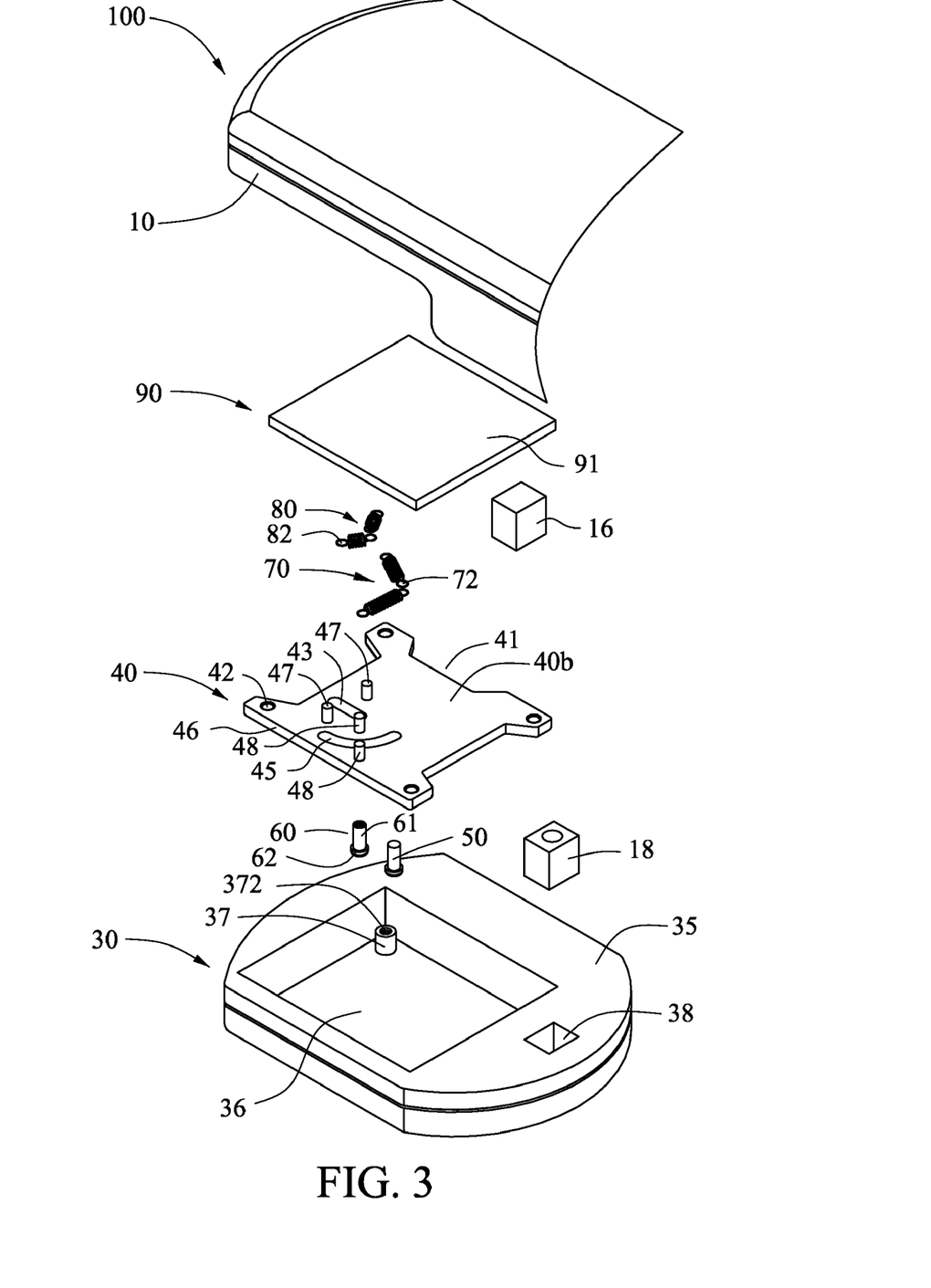
FIG. 3 is an exploded isometric view of the portable electronic device of FIG. 1, but viewed from another angle.
Figure 4:
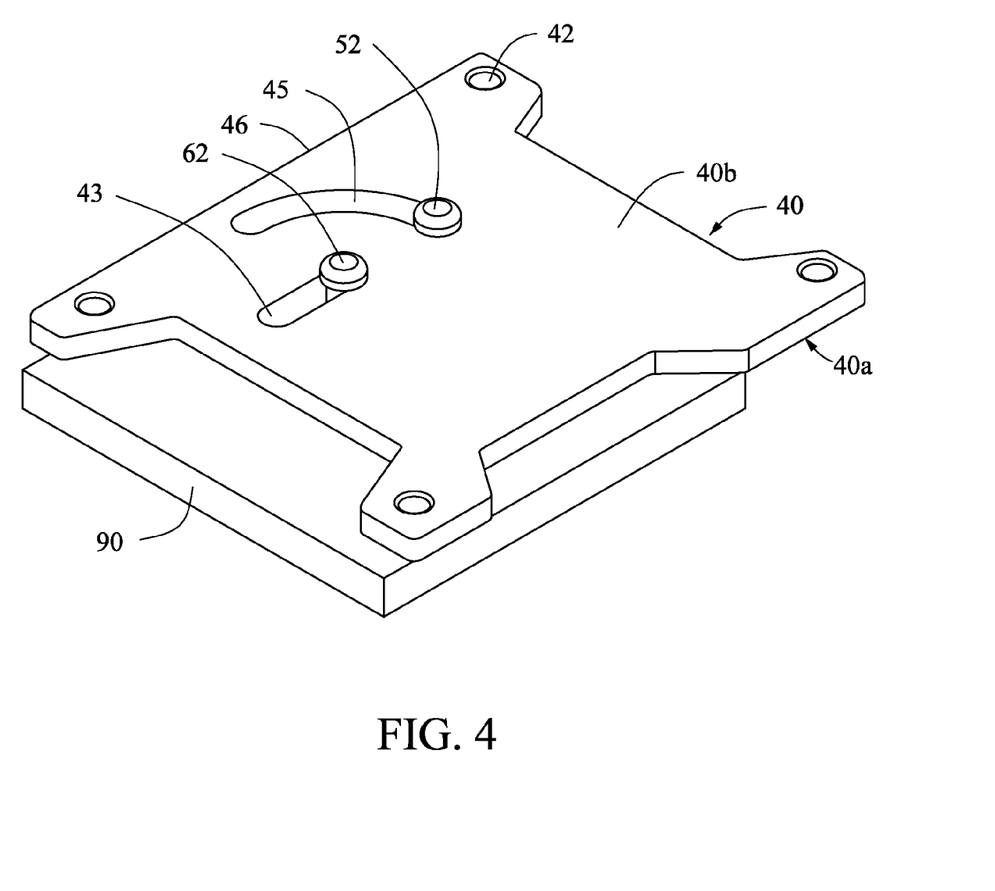
FIG. 4 is a partial isometric view of the keypad assembly according to an exemplary embodiment.

Referring to FIG. 3, a rotatable mounting portion 36 and a second DC mounting portion 38 are defined in the mounting surface 35. The rotatable mounting portion 36 is a substantially rectangular cavity defined on the mounting surface 35 corresponding to the keyboard mounting portion 128 and is for receiving the rotating member 40 of the keypad assembly 20. A fastening portion 37 protrudes from each corner of the rotatable mounting portion 36. The fastening portions 37 are substantially hollow cylinders with inner screw threads 372. The second DC mounting portion 38 is a substantially rectangular cavity defined adjacent to a curved end portion of the mounting surface 35.

The rotating member 40 is substantially rectangular and includes a top surface 40a and an opposite bottom surface 40b. One of four edges of the rotating member 40 is a rotating edge 46. In addition to the rotating edge 46, the other three edges of the rotating member 40 each define a trapezoidal cutout 41. Each corner of the rotating member 40 defines a through hole 42 corresponding to one fastening portion 37. The rotating member 40 further defines a strip-like slit 43 parallel to the rotating edge 46 and an arcuate slit 45 adjacent to the strip-like slit 43.

The rotating member 40 includes a first pair of positioning posts 47 and a second pair of positioning posts 48 on the bottom surface 40b, a rotatory shaft 50 and a sliding shaft 60 on the top surface 40a, two first springs 70 and two second springs 80. The first pair of positioning posts 47 are arranged on two opposite sides of the strip-like slit 43. The second pair of positioning posts 48 are on two opposite sides of the arcuate slit 45. The rotatory shaft 50 is a magnetic screw with a nut 52. The sliding shaft 60 includes a hollow cylinder 61 and a nut 62. Each first spring 70 has a ring formed at opposite ends thereof. One ring 72 of each first spring 70 is configured to sleeve on the sliding shaft 60, and the other end ring 72 of each first springs 70 is configured to sleeve on one positioning post 48. Each second spring 80 has a ring 82 formed at opposite ends thereof. One ring 82 of each second spring 80 is configured to sleeve on the rotatory shaft 50 and the other end ring 82 of each second spring 80 is configured to sleeve on one positioning post 47.

The base unit 90 includes a base 91, a support post 93, a support portion 95, and a fixing portion 97. The base 91 is substantially rectangular and can be made of a magnetic material, such as iron or steel. The support post 93 is cylindrical and arranged in a central portion of the base 91 for supporting the rotating member 40. The support portion 95 is cylindrical and arranged adjacent to the support post 93. The fixing portion 97 is a substantially cylindrical axis with outer screw thread. The support portion 95 is arranged adjacent to the support post 93.

Figure 5:
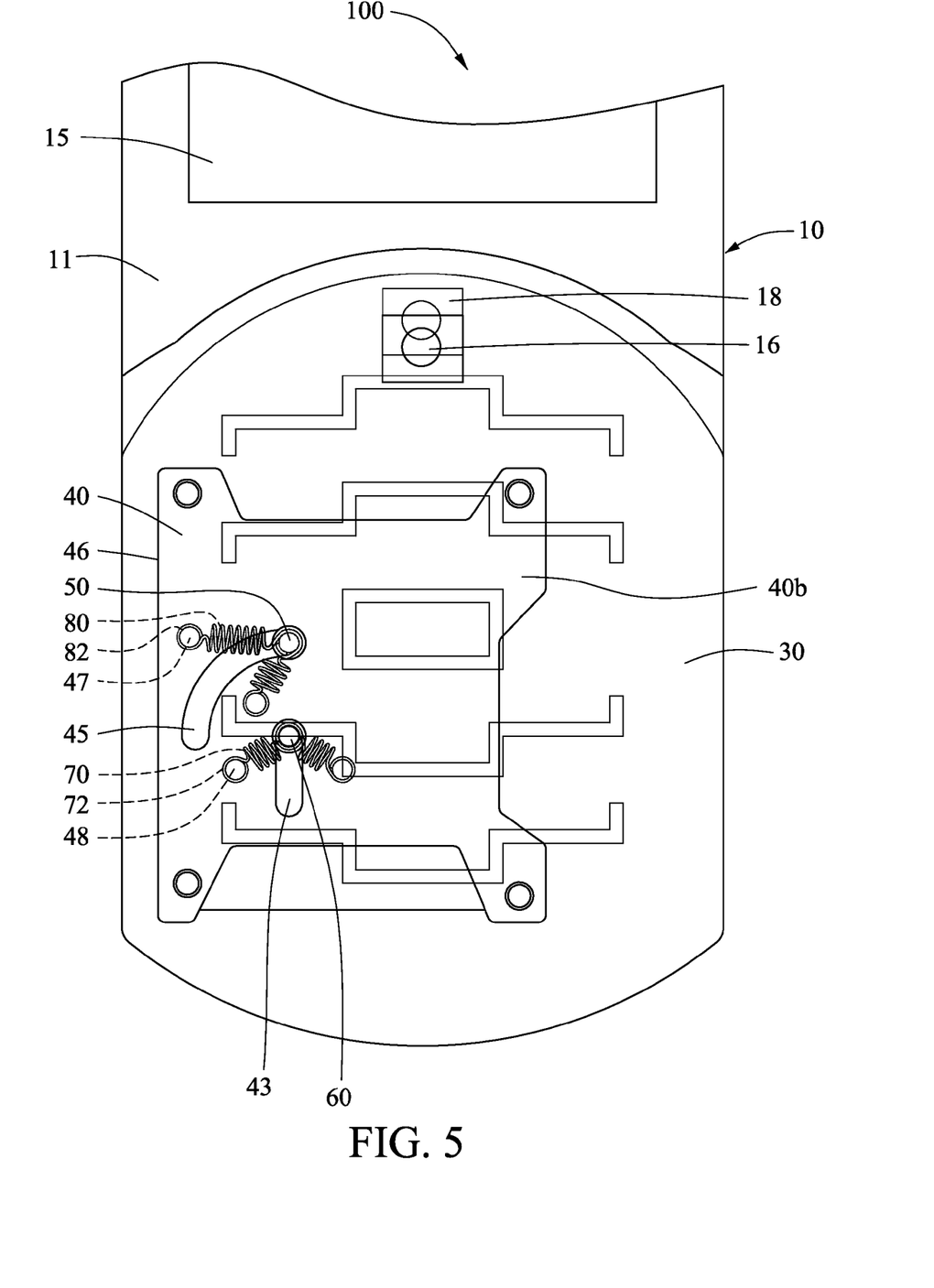
FIG. 5 is a partial schematic view of the portable electronic device of FIG. 1, wherein the keypad assembly is in an initial position.
Figure 6:
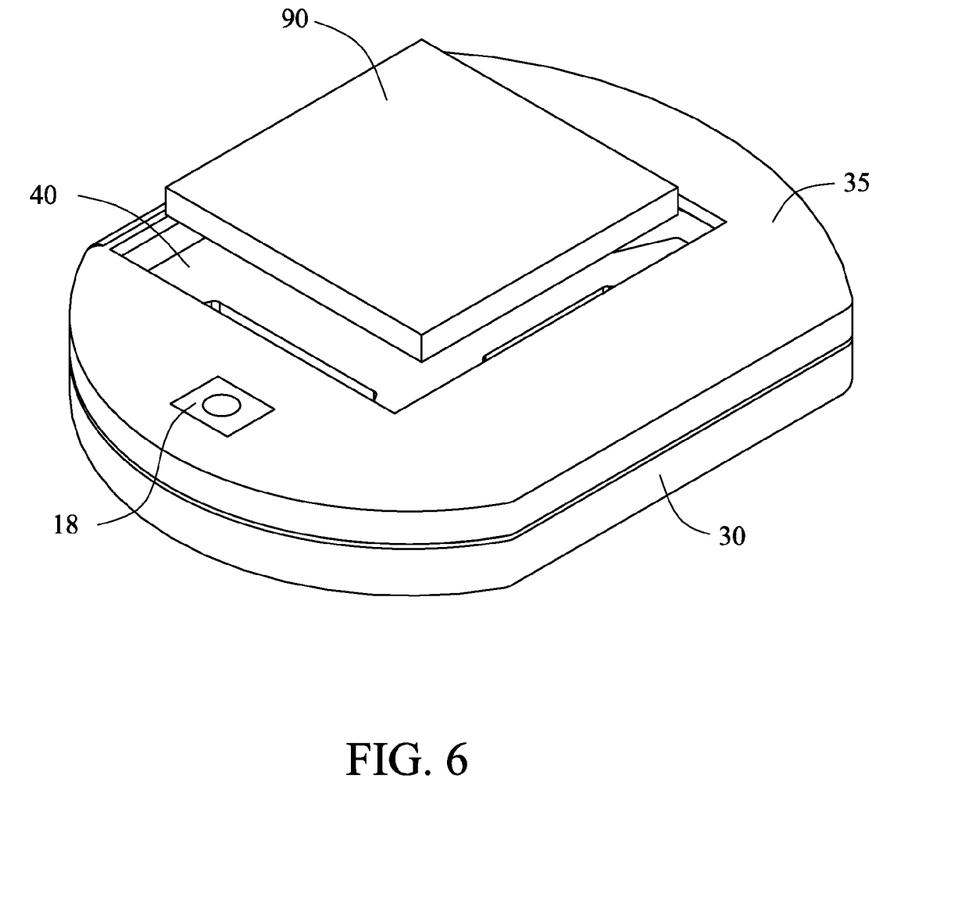
FIG. 6 is an isometric view of the keypad assembly, but viewed from another angle.

In assembly, the rotatory shaft 50 and the sliding shaft 60 are inserted into and passed through the arcuate slit 45 and the strip-like slit 43, respectively. In this way, the nut 52 of the rotatory shaft 50 and the nut 62 of the sliding shaft 60 are protrusively arranged on the bottom surface 40b of the rotating member 40. Referring to FIG. 5, the rings 72 of the first springs 70 are configured to respectively sleeve on the second pair of positioning posts 48 and the sliding shaft 60. In addition, the rings 82 of the second springs 80 are configured to respectively sleeve on the first pair of positioning posts 47 and the rotatory shaft 50.

The rotating member 40 is then assembled to the base unit 90. The support post 93 of the base unit 90 is configured for resisting bottom surface 40b of the rotating member 40. The rotatory shaft 50 is configured for resisting the support portion 95 of the base unit 90 by magnetic attraction between the rotatory shaft 50 and the base unit 90. The sliding shaft 60 is screwed to the fixing portion 97 of the base unit 90. Subsequently, aligning the four through holes 42 of the rotating member 40 with the four fastening portions 37 of the rotatable mounting portion 36, thereby assembling the rotating member 40 with the key module 30 via screws (not shown). The second DC module 18 is installed in the second DC mounting portion 38.

The portable electronic device 100 equipped with the assembled keypad assembly 20 is shown. The first DC module 16 is installed in the first DC mounting portion 126. The base unit 90 of the keypad assembly 20 is installed in the keyboard mounting portion 128. At this time, the first DC module 16 is covered by the keypad assembly 20. In addition, the second DC module 18 installed on the mounting surface 35 of the key module 30 is also covered. In this case, the first DC module 16 and the second DC module 18 are covered when not in use.

Figure 7:
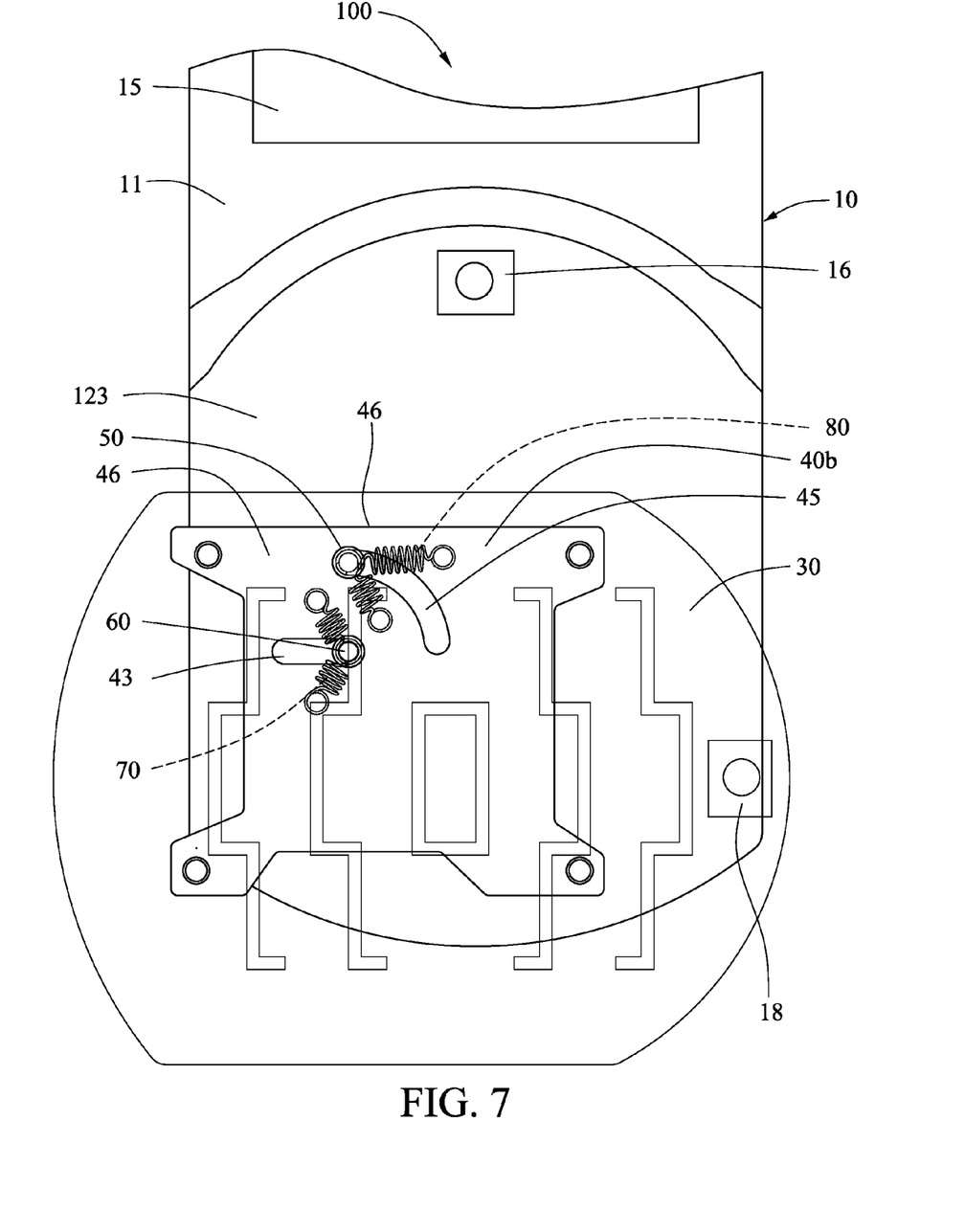
FIG. 7 is a partial schematic view of the portable electronic device of FIG. 1, wherein the keypad assembly is rotated through 90 degrees.

When the user wants to use the first DC module 16, the key module 30 may be rotated clockwise relative to the rotatory shaft 50 as shown in FIG. 7 such that the first DC module 16 is uncovered. At the same time, the rotatory shaft 50 of the keypad assembly 20 slides from one end of the arcuate slit 45 to the other end of the arcuate slit 45.

Figure 8:
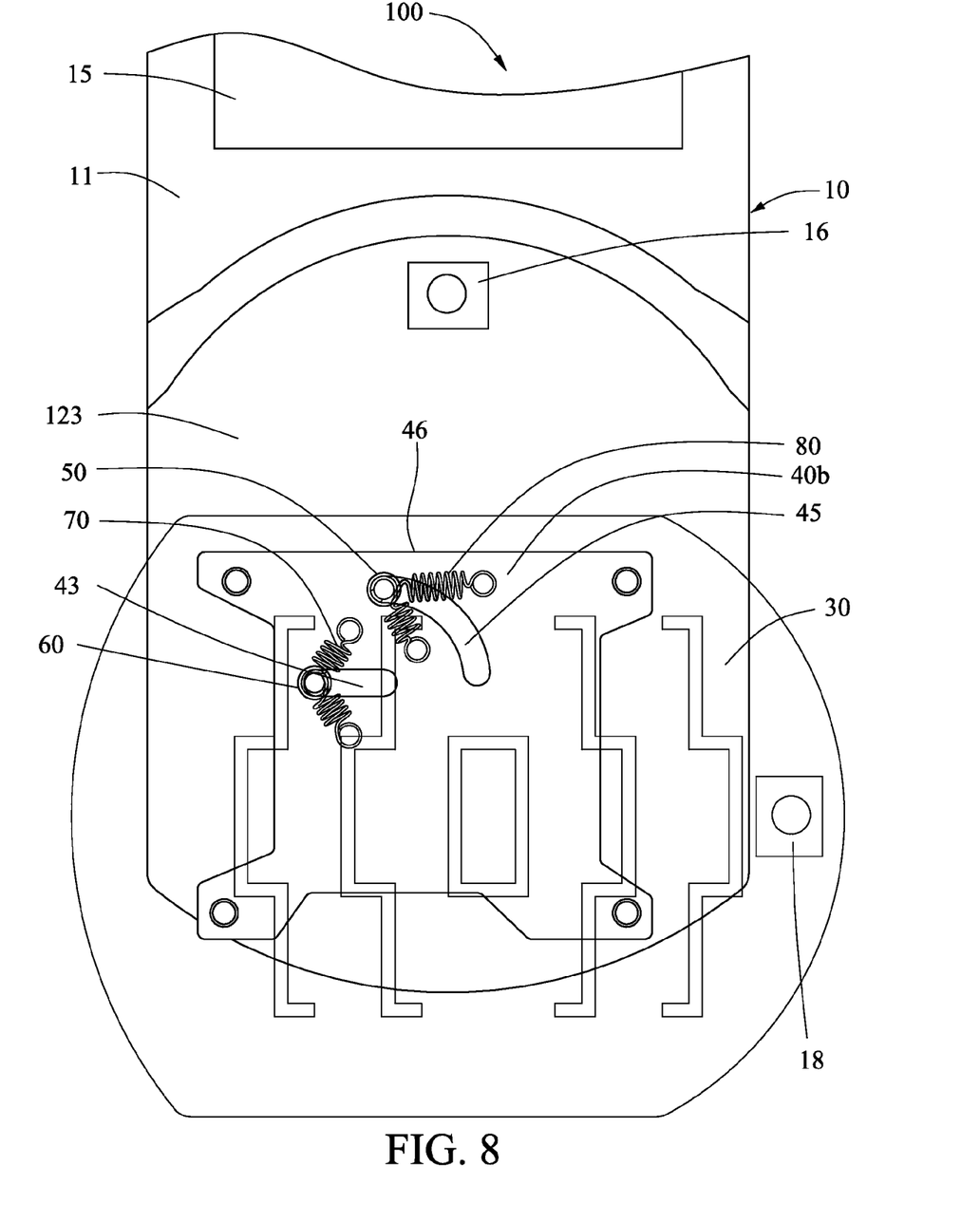
FIG. 8 is a partial schematic view of the portable electronic device of FIG. 7, wherein the keypad assembly is further pushed away from the main body.

When the user wants to use the second DC module 18, the key module 30 needs to be further rightwardly pushed as shown in FIG. 8. In this way, the sliding shaft 60 slides along the strip-like slit 43 of the rotating member 40. During the sliding process, the rotatory shaft 50 is disengaged from the support portion 95 of the base unit 90 and then slides rightwardly. In this way, the second DC module 18 is exposed. After usage of the first DC module 16 or the second DC module 18, the key module 30 may be leftwardly pushed and then rotated counter-clockwise to return to its original position. In brief, the key module 30 is configured to rotate around the rotatory shaft 50 along the arcuate slit 45 relative to the base unit 90, and is configured to slide along the strip-like slit 43 relative to the base unit 90.

The keypad assembly 20 may be designed to expose the second DC module 18 with only rotatory operation. It can also be understood that the base 91 may be omitted such that keypad assembly 20 may be directly assembled to the main body 10. In this way, the support post 93, the support portion 95, and the fixing portion 97 are directly arranged on the main body 10.

In view of the above, at least one DC module may be disposed between the main body 10 and the keypad assembly 20 of the portable electronic device 100 by means of a rotatory keypad. The DC module can be prevented from being damaged or contaminated by dust when not in use.

As described above, the keypad assembly 20 may be applied to various portable devices, beyond the cellular phone illustrated, and/or with other devices requiring a keypad assembly that selectably facilitates the achievement of fully open and fully closed positions.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A keypad assembly, comprising:
    a key module including an operating surface and a mounting surface opposite to the operating surface, the operating surface having a keypad disposed thereon;
    a base unit, wherein the key module is rotatably and slidingly installed on the base unit;
    a rotating member installed on the mounting surface, the rotating member defining a strip-like slit and an arcuate slit;
    a rotary shaft passing through the arcuate slit to resist the base unit by magnetic attraction; and
    a sliding shaft passing through the strip-like slit for attaching to the base unit.

2. The keypad assembly as claimed in claim 1, wherein the key module is configured to rotate around the rotary shaft through 90 degrees along the arcuate slit relative to the base unit, and is configured to be slid along the strip-like slit relative to the base unit.

3. The keypad assembly as claimed in claim 1, wherein the base unit includes a fixing portion protruding therefrom, the fixing portion is a cylindrical axis with outer screw thread, the sliding shaft is screwed with the fixing portion.

4. The keypad assembly as claimed in claim 1, wherein the base unit further includes a cylindrical support post for resisting the rotating member, a support portion for supporting the rotary shaft and being attracted by magnetism of the rotary shaft.

5. The keypad assembly as claimed in claim 1, wherein the keypad assembly further includes two first springs, each first spring having a ring formed at opposite ends, one ring of each first spring is configured to sleeve on the rotary shaft, and the other end ring of each first springs is configured to sleeve on one positioning post.

6. The keypad assembly as claimed in claim 1, wherein the keypad assembly further includes two second springs, each second spring having a ring formed at opposite ends, one ring of each second spring is configured to sleeve on the sliding shaft and the other end ring of each second spring is configured to sleeve on one positioning post.

7. A portable electronic device, comprising:
    a main body;
    a keypad assembly rotatably installed on the main body, the keypad assembly including a key module, a base unit, a rotating member, a rotary shaft, and a sliding shaft; the key module rotatably and slidingly installed on the base unit and including an operating surface and a mounting surface opposite to the operating surface, the operating surface having a keypad disposed thereon; the rotating member installed on the mounting surface and defining a strip-like slit and an arcuate slit; the rotary shaft passing through the arcuate slit to resist the base unit by magnetic attraction, and the sliding shaft passing through the strip-like slit for attaching to the base unit; and at least one DC module being installed between the main body and the keypad assembly, and the at least one DC module being exposed by rotating the keypad assembly.

8. The portable electronic device as claimed in claim 7, wherein the at least one DC module is installed on the main body or on the keypad assembly.

9. The portable electronic device as claimed in claim 8, wherein the key module is configured to rotate around the rotary shaft through 90 degrees along the arcuate slit relative to the base unit, and is configured to be slid along the strip-like slit relative to the base unit.

10. The portable electronic device as claimed in claim 8, wherein the base unit includes a fixing portion protruding therefrom, the fixing portion is a cylindrical axis with outer screw thread, the sliding shaft is screwed with the fixing portion.

11. The portable electronic device as claimed in claim 8, wherein the base unit further comprises a cylindrical support post for resisting the rotating member, a support portion for supporting the rotary shaft and being attracted by magnetism of the rotary shaft.

12. The portable electronic device as claimed in claim 8, wherein the keypad assembly further includes two first springs, each first spring having a ring formed at opposite ends, one ring of each first spring is configured to sleeve on the rotary shaft, and the other end ring of each first springs is configured to sleeve on one positioning post.

13. The portable electronic device as claimed in claim 8, wherein the keypad assembly further includes two second springs, each second spring having a ring formed at opposite ends, one ring of each second spring is configured to sleeve on the sliding shaft and the other end ring of each second spring is configured to sleeve on one positioning post.

* * * * *